April 21, 1964  C. R. HOLLIS  3,129,646
PROCESS AND APPARATUS FOR MAKING BAG CLOSURES
Filed Jan. 8, 1963  7 Sheets-Sheet 1

FIG. 1

INVENTOR.
CLINTON R. HOLLIS
BY
ATTORNEY

FIG. 6

April 21, 1964 C. R. HOLLIS 3,129,646
PROCESS AND APPARATUS FOR MAKING BAG CLOSURES
Filed Jan. 8, 1963 7 Sheets-Sheet 5

FIG. 7
FIG. 8

INVENTOR.
CLINTON R. HOLLIS
BY
ATTORNEY

April 21, 1964 C. R. HOLLIS 3,129,646
PROCESS AND APPARATUS FOR MAKING BAG CLOSURES
Filed Jan. 8, 1963 7 Sheets-Sheet 7

INVENTOR.
CLINTON R. HOLLIS
BY
ATTORNEY

United States Patent Office 3,129,646
Patented Apr. 21, 1964

3,129,646
PROCESS AND APPARATUS FOR MAKING
BAG CLOSURES
Clinton R. Hollis, Camden, Ark., assignor to International Paper Company, New York, N.Y., a corporation of New York
Filed Jan. 8, 1963, Ser. No. 250,131
22 Claims. (Cl. 93—27)

This invention relates to the manufacture of bags, especially paper bags of the multi-wall variety. More particularly, it relates to a process of and an apparatus for making closures for such bags and the products of such process and apparatus.

It is known that, in the field of pasted closures for multi-wall bags, the utilization of the so-called stepped-in bag has come to the fore since the mid-1950's. See for example, U.S. Pat. Nos. 2,761,612; 2,810,509; and, 2,875,944. It is also known that the manufacture of stepped-in bags requires complicated and space-consuming machinery which is expensive to purchase and to maintain. Such machinery includes tubers, such as those manufactured by Windmöller & Hölscher of Lengerich i. Westfalen, Germany, which require a multiplicity of patterns, knives, etc., to enable the prrduction of a full line of multi-wall bags. It also includes bottomers such as those covered, for example, by U.S. Pat. Nos. 2,570,047; 2,753,769; and, 2,887,012. Again, this machinery requires hundreds and even thousands of square feet of floor space to give the manufacturer of bags an adequate production range.

The product of this invention is a new and particularly advantageous glued or pasted bag closure for open mouthed or valved multi-wall bags which is siftproof and as strong as or stronger than any known pasted or sewn bag closure. One of its advantages is that, along with the apparatus of the present invention, a conventional tuber (rather than a stepped-in bag tuber) which turns out flush-cut multi-wall tube ends can be used for making it. Such a tuber, of course, is much simpler in design and operation than the stepped-in bag tuber and it requires less maintenance and consumes less space. And the apparatus or bottomer of the present invention is surprisingly simple and sturdy in construction, needs a minimum of care and upkeep, and fits, in its standard embodiment and with ample room for its operator, into a space of roughly 24 to 36 sq. ft. Other advantages of the present invention will be readily apparent to those skilled in the art from the disclosure hereinafter and the attached drawings.

Broadly viewed, the present invention comprehends taking in hand literally or mechanically a flat bag tube which has opposing surfaces, travelling the normally flush-cut tube end laterally, slitting the end longitudinally at spaced intervals to define a plurality of tongues, and folding each alternate tongue toward one of the opposing surfaces. preferably, the process of the present invention is continuous and also includes the positioning of a tape about the tongues and over the tube end and an application of adhesive to conjoin the tape, the tongues, and the tube end. The apparatus of the present invention comprehends a combination of mechanical elements which is capable of performing the process and producing the products of the present invention.

For a better understanding of the present invention and the manner of operation and result comprehended thereby, reference should be had to the attached drawings in which.

Figure 1:
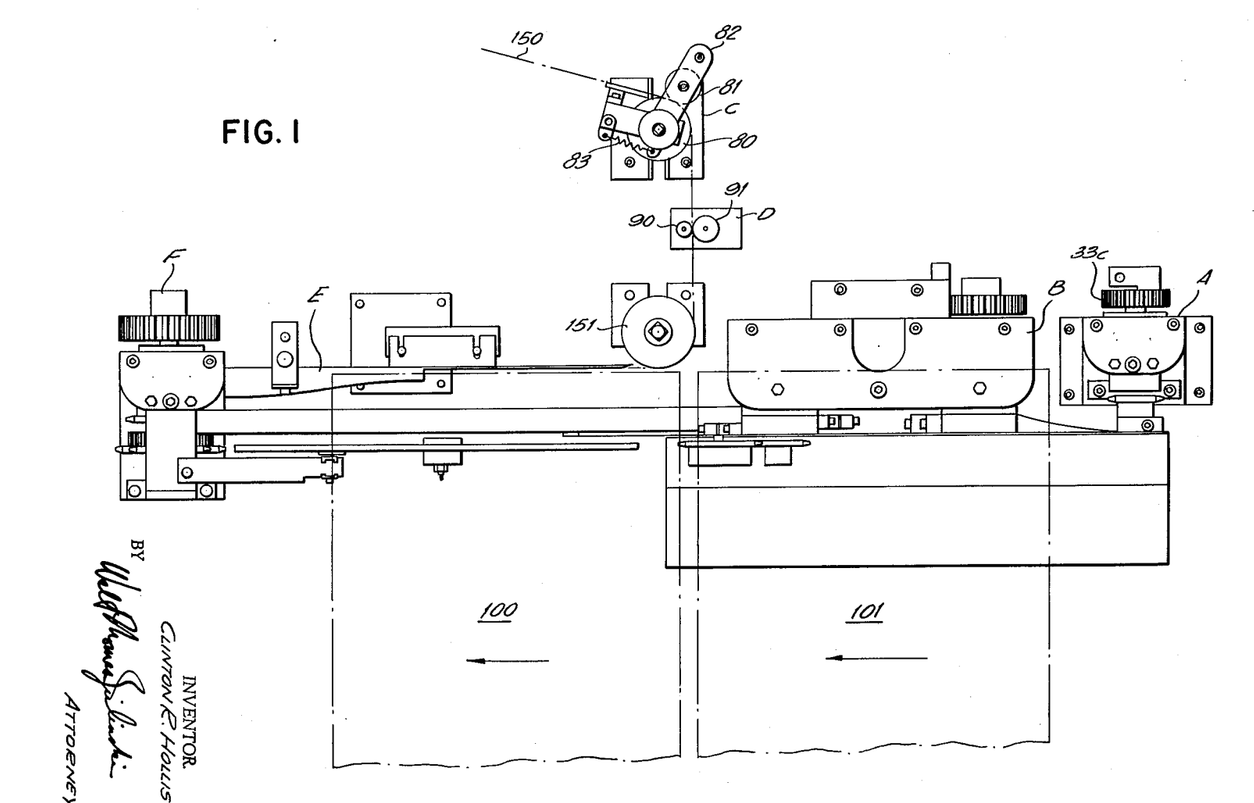
FIGURE 1 is a plan view of the apparatus of the present invention.
Figure 2:
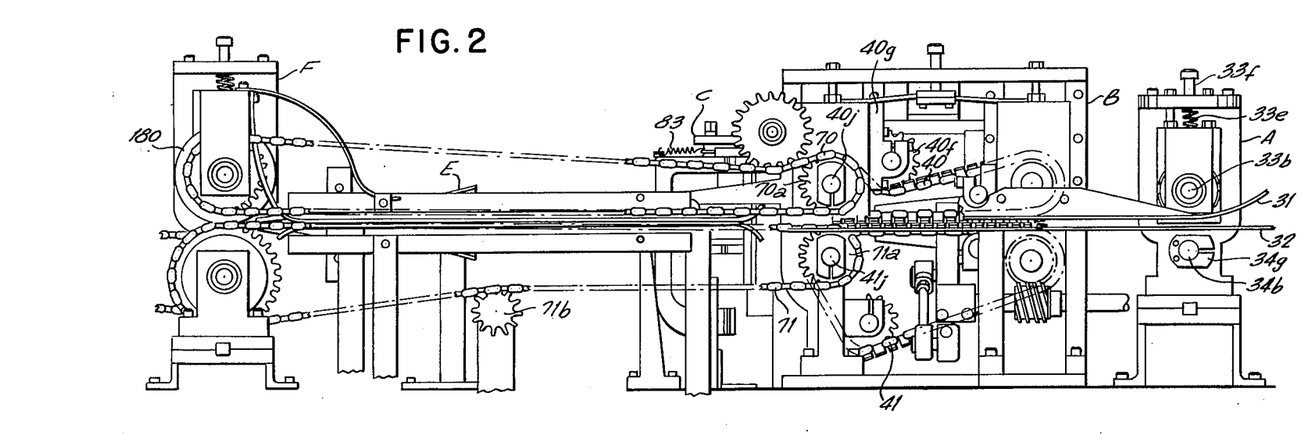
FIGURE 2 is a side view of the apparatus of FIGURE 1.
Figure 3:
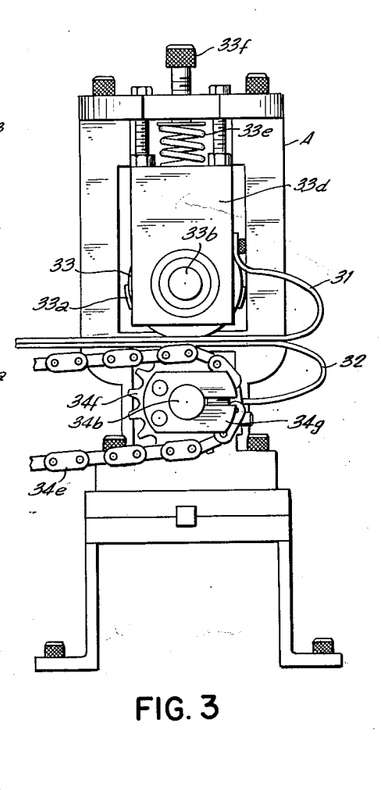
FIGURE 3 is an enlarged side view of the first sub-assembly of FIGURE 2.
Figure 4:
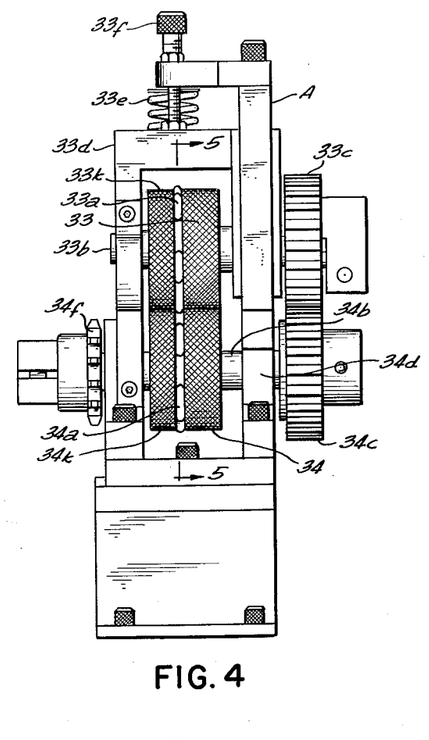
FIGURE 4 is an enlarged end view of the sub-assembly of FIGURE 3.

The first, second, third, fourth, fifth, and sixth sub-assemblies of the apparatus shown in FIGURES 1 and 2 include the following: a pre-creaser unit designated A; a tongue or tab shear and separator unit designated B; a tape creaser unit designated C; an adhesive applicator unit D; a tape folder unit E, and a tape roller unit F. The use of unit A is more or less optional. It is preferred in all cases, but should be deemed necessary only where heavier stocks of paper or other sheet material or a larger number of plies thereof make up the bag tubes to be closed on the apparatus of the invention.

In its depicted, and preferred, embodiment (see FIGURES 2 to 5), pre-creaser unit A includes two rails 31 and 32 between the horizontal portions of which flat bag tubes 100 and 101 are positioned in succession manually or by mechanical, preferably automatic, means. It also includes two, not quite contiguous, scoring wheels 33 and 34 provided with rounded, equally spaced apart teeth 33a and 34a, respectively, with are disposed in a male and female relationship. Wheels 33 and 34 are mounted on shafts 33b and 34b, respectively, which are connected in a driven-driver relation by means of spur gears 33c and 34c on such shafts. It will be noted that, while shaft 33b is journaled in a floating mounting 33d which is biased or urged downwardly by spring 33e, the adjustment of which is supplied by set screw 33f, shaft 34b is journaled in a fixed mounting 34d and is driven by chain 34e and sprocket 34f (engaged therewith and fixedly mounted on shaft 34b with the help of bracket 34g). Chain 34e is driven by a sprocket 36 shown schematically in FIGURE 6 in connection with worm gear 37 which is meshed with worm 35a of drive shaft 35. Sprocket 36 is also visible in FIGURE 7 where it is shown mounted on shaft 41c.

Figure 5:
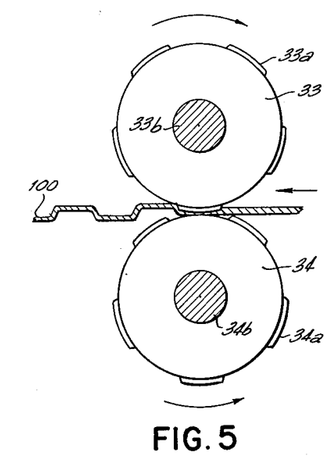
FIGURE 5 is an enlarged, partially broken away, side view of elements of the sub-assembly of FIGURE 4, taken along line 5—5.

Scoring wheels 33 and 34 have, in addition to scoring teeth 33a and 34b which are centrally and radially disposed thereon, knurled surfaces 33k and 34k, respectively. Such surfaces, together with such teeth, provide the means whereby bag tubes 100 and 101 are travelled through unit A and toward unit B of the apparatus. They grasp the upper and lower, opposing surfaces of the bag tubes as wheel 33 turns clockwise and wheel 34 turns counterclockwise (as depicted in FIGURE 5) and progress the tubes laterally from right to left, even as teeth 33a and 34a provide a crease line or score line on each tube parallel to its end. Clearly, the resulting crease line is made up of alternately male and female score segments 100a and 100b (shown in FIGURE 8) equal in their lengths to the lengths of teeth 33a and 34a.

In its depicted, and preferred form (see FIGURE 2 and 6 to 8), tongue or tab shear and separator unit B includes a pair of endless chains 40 and 41 equipped with lugs 40a and 41a. It could just as well include suitable belts of rubber or the like for the same purpose. The lugs, positioned by the chains, initially grasp flat bag tubes 100 and 101 as they come from unit A and continue their lateral travel. Preferably, at the same time, lugs 40a and 41a, having widths equal to the lengths of male and female score segments 100a and 100b, are disposed in registration with such segments, so that their edges parallel to the chains' travel reside on or in the scores.

Figure 6:
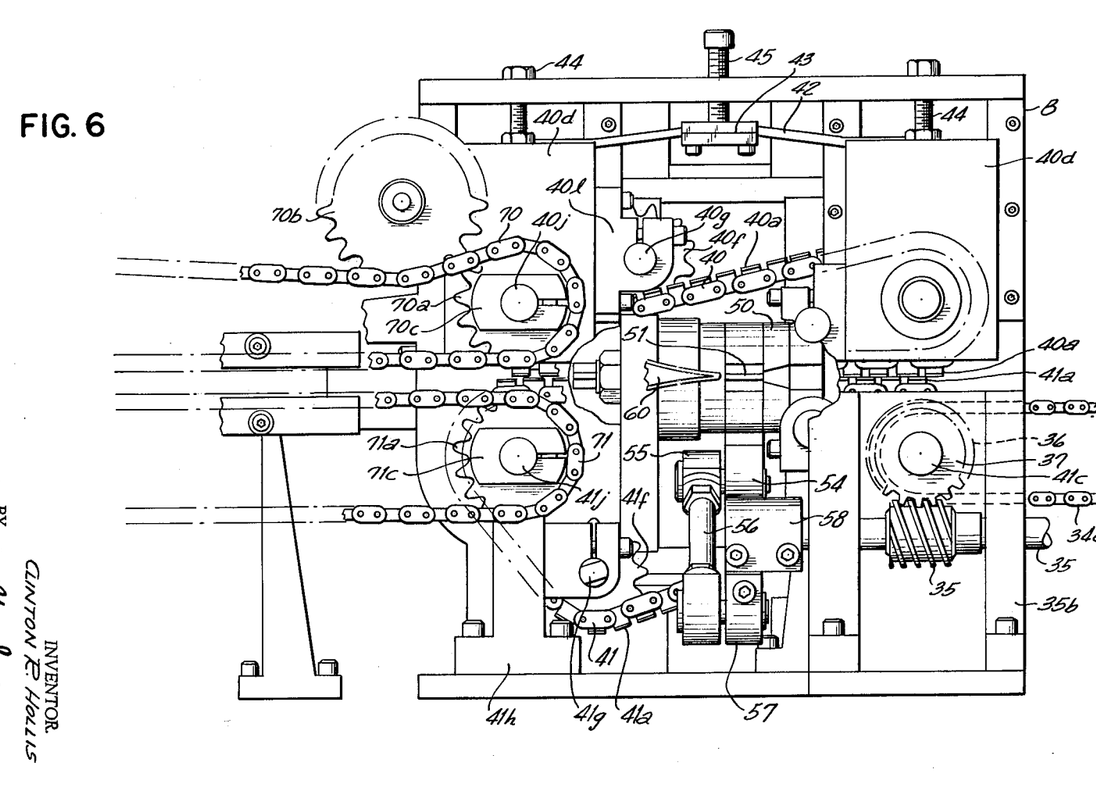
FIGURE 6 is an enlarged, partially broken away, side view of the second sub-assembly of FIGURE 2.
Figures 7, 8:
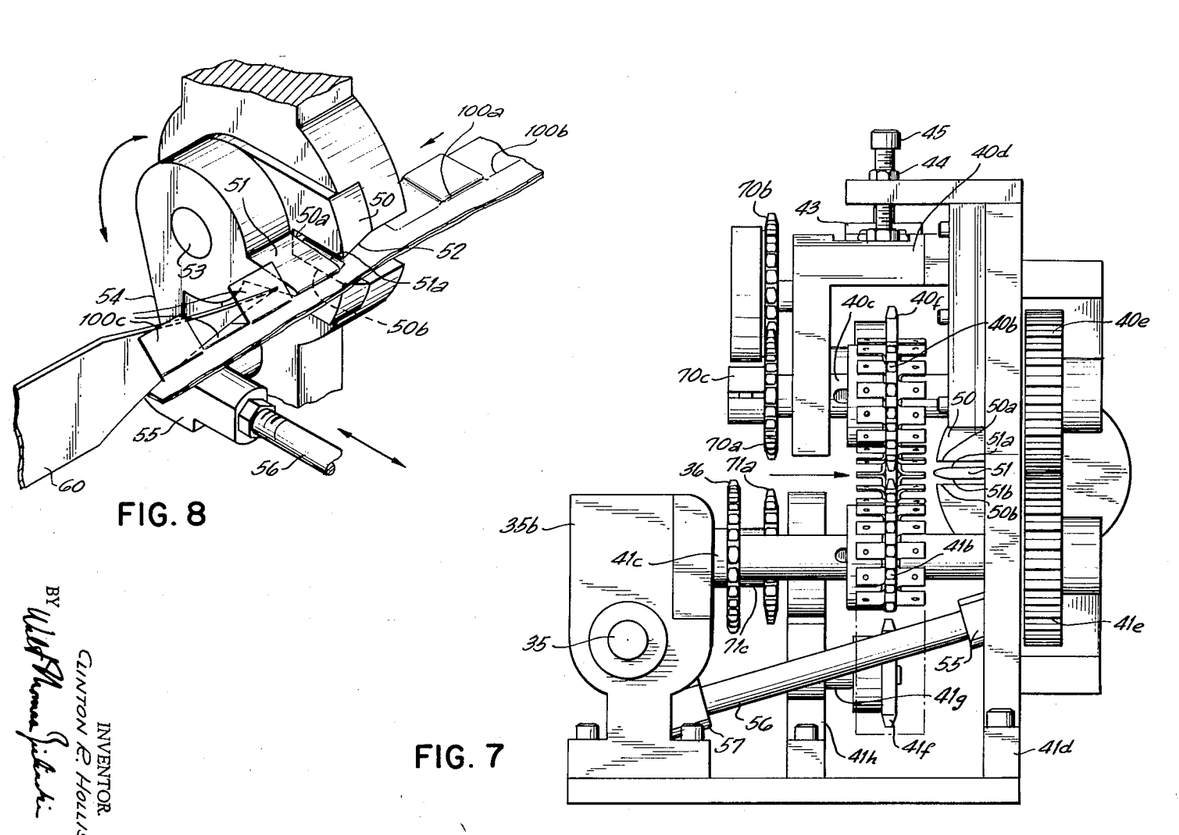
FIGURE 7 is an enlarged end view of the sub-assembly of FIGURE 6.
FIGURE 8 is an isometric view of elements of the sub-assembly of FIGURE 6.

Chains 40 and 41 are engaged for movement by sprockets 40b and 41b, respectively, as best seen in FIGURE 7. Sprocket 40b is mounted and fastened on shaft 40c which is journaled near its ends in one-half of a floating mounting 40d supported by leaf spring 42 and bracket 43 of unit B. Set screws 44 and 45 permit the adjustment of such mounting to enable such unit to accept any thickness of bag tube. Also depicted is the mounting on shaft 40c near one of its ends of spur gear 40e, which is positioned to mesh with like spur gear 41e on the end of shaft 41c which carries sprocket 41b. Shaft 41c is, in turn, shown to be journaled for rotation, near such end, in fixed mounting 41d and, near its other end, in the backplate of support 35b for propulsion shaft 35. Not shown in FIGURE 7, but to be discerned in FIGURE 6, is the engagement of worm gear 37, which is mounted on shaft 41c, with worm 35a on drive shaft 35 and the engagement of sprocket 36, also on shaft 41c, with chain 34e powering unit A. In other words, FIGURES 6 and 7 together show the cooperation of units A and B with each other and with drive shaft 35.

FIGURES 2, 6, and 7 show several idler sprockets which assist in tensioning chains 40 and 41 as they progress endlessly within unit B. Sprocket 41f is shown mounted on a short rotatable shaft 41g which is suitably journaled in and supported by post 41 affixed to the base plate 41i of unit B, while sprocket 40f is mounted on short shaft 40g and journaled by standard means in bracket 40h which is an adjunct of the other half of floating assembly 40d. Not directly visible, but schematically suggested in FIGURES 2 and 6, are other sprockets mounted on shafts 40j and 41j inside unit B. These serve to supply power to chains 70 and 71, as hereinafter noted.

Leaving, for a moment, the means of unit B for advancing bag tubes 100 and 101, which are in no sense limited to those of the attached drawings, one arrives at the heart of such unit; the tab shear and separator (shown best in FIGURES 7 and 8). This device includes a pair of shearing blades 50 and 51 having sharpened edges 50a, 50b, 51a, and 51b. Blade 50 is fixed in its position with relation to unit B and the bag tubes passing therethrough. Indeed, it is provided with means defining a channel 52 for the ends of flat tubes 100 and 101 as they, horizontally disposed and laterally moving, proceed through such unit. Blade 51 is, on the other hand, mounted for movement; namely, a reciprocating movement wherein any point thereon describes an arcuate path about the axis provided by the centerline of hub 53 which is fastened to blade 50. As seen in FIGURE 8, blade 51 forms the bill of a duck which is made to bob up and down by means of a sliding engagement between blade 51 and hub 53 and a linkage between the duck's neck 54, connecting rod bracket 55, and reciprocating connecting rod 56. Rod 56 is, in turn, connected to cam arm 57 of cam 58 which is mounted on drive shaft 35.

As depicted by FIGURE 8, blades 50 and 51 abut and, accordingly, when blade 51 moves past channel 52 in blade 50, which is largely framed by cutting edges 50a and 50b, there are provided two scissors or shears. First, as blade 51 moves downwardly, there is the scissors formed by edges 51b and 50b and, then, as blade 51 returns upwardly, there is the scissors formed of edges 51a and 50a. Consequently, anything passing out of channel 52 in blade 50 and into the path of reciprocating blade 51 is positioned to be cut twice during each cycle of the blade's movement and, if it be tube 100 which has been given or is being given a continuous advancement through channel 52, it will be slit or cut longitudinally twice per cycle at separated or spaced points or intervals by the bladed device. Preferably, the time of each cycle is such that the slits come at intervals measured by and corresponding to the lengths of male and female score segments 100a and 100b on tube 100 and, of course, this is readily achieved when, as shown, all the elements of the present apparatus are operated from a single drive source, e.g., shaft 35, and can be made to cooperate in a timed relationship. Moreover, each tongue or tab 100c, even as it is being formed along its trailing edge by such device, is inclined or depressed toward an opposing tube surface, so as to be separated from its immediate predecessor and successor, as the result of the engagement therewith of the upper and lower surface of blade 51 as it moves upwardly or downwardly during each cycle. Preferably, of course, each tongue inclination or depression takes the maximum advantage of the broken line of scoring provided bag tube 100 in unit A; that is, the inclination of some tongues, as in FIGURE 8, comes along female scores 100b, while the depression on other, alternate tongues comes along male scores 100a. It also takes maximum advantage of the positioning of the edges of lugs 40a and 41a over or under the several score segments by utilizing such edges as the fulcrums about which the tongues 100c are moved by blade 51. Next, no sooner than the separation of tongues 100c is begun by blade 51, the continuing lateral movement of tube 100 by means of chains 40 and 41 brings plow 60 into play. Because of its interposition, the inclined tongues cannot fall back into a generally horizontal plane, where the natural characteristics of the tube plies will urge them, and the depressed tongues cannot rise up into the same plane. At the same time, the folding of each alternate tongue toward an opposing tube surface is given added permanence.

Once plow 60 is brought into contact with tongues 100c, tube 100 is essentially finished as far as unit B is concerned and chains 40 and 41 are functionally displaced by lugged chains 70 and 71 (see FIGURES 2 and 6) as the means for propelling tube 100 laterally. Chains 70 and 71, which could as well be endless belts of rubber or the like, are engaged by working sprockets 70a and 71a and idler sprockets 70g and 71b. Sprocket 70a is secured by shaft 40j of mounting 40d with the aid of clamp 70c, while sprocket 71a is secured on shaft 41j of mounting 41h with the aid of clamp 71c. Shafts 40j and 41j, are of course, propelled by chains 40 and 41, as noted above.

Figure 9:
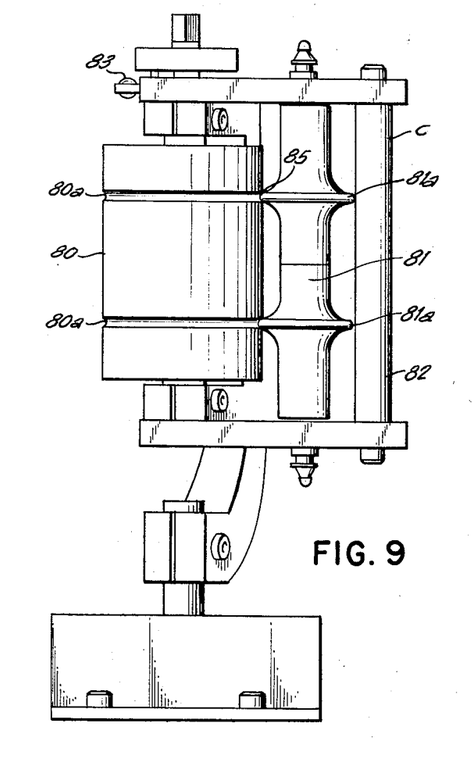
FIGURE 9 is an end view of the third sub-assembly of FIGURE 2.

As chains 70 and 71 advance tubes 100 and 101 laterally, a closure tape 150 is brought past units C and D and into juxtaposition with the tube ends. Unit C, the tape creaser shown in FIGURES 1 and 9, consists chiefly of a female scoring roll 80 and a male scoring roll 81 which are parallelly and vertically mounted for rotation and to provide a nip 85 therebetween for tape 150. It wil be noted that the rolls are grooved and tongued at 80a and 81a, respectively, to give tape 150 two parallel longitutinal scores or foldlines. Scoring roll 81 is, further, mounted in a bracket 82 which can be made to pivot about the axis of roll 80, so that the nip can be opened by hand during a tape threading and, then, closed again and suitably maintained with the aid of spring 83.

Figure 10:
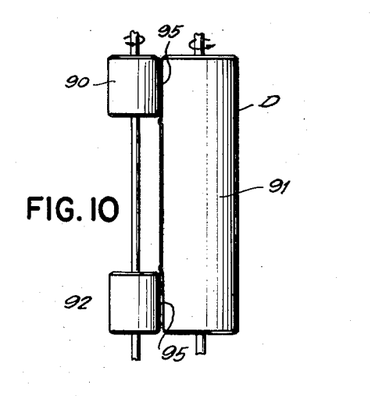
FIGURE 10 is an end view of the fourth sub-assembly of FIGURE 2.

Unit D (as seen best in FIGURES 1 and 10) has the function of applying adhesive to tape 150 after it leaves unit C and before it is combined in unit E with tubes 100 and 101 coming from unit B. Unit D can be adapted to employ any commercially available adhesive, glue, or paste deemed suitable, for any one of a number of reasons well known to the art, in bag closures, although it has been found, thus far, that hot melt adhesives are particularly advantageous. Thus, for example, hot melt adhesive is flowed or extruded in unit D from a heater (not shown) onto rotatable glue rolls 90, 91, and 92 by conventional means. Then, the rolls, which are preferably disposed to provide a discontinuous nip 95 for tape 150, apply the adhesive over one entire surface of the tape and over two separated zones or portions (bounded by the tape borders and scores) on the other surface of the tape. From unit D, glued tape 150 passes to tape pivot idler 151, which preferably impinges against the tape only in that zone thereof not glued, to be brought generally parallel to the laterally moving ends of tubes 100 and 101 in tape folder unit E.

Figures 11, 12, 13, 14, 15, 16, 17:
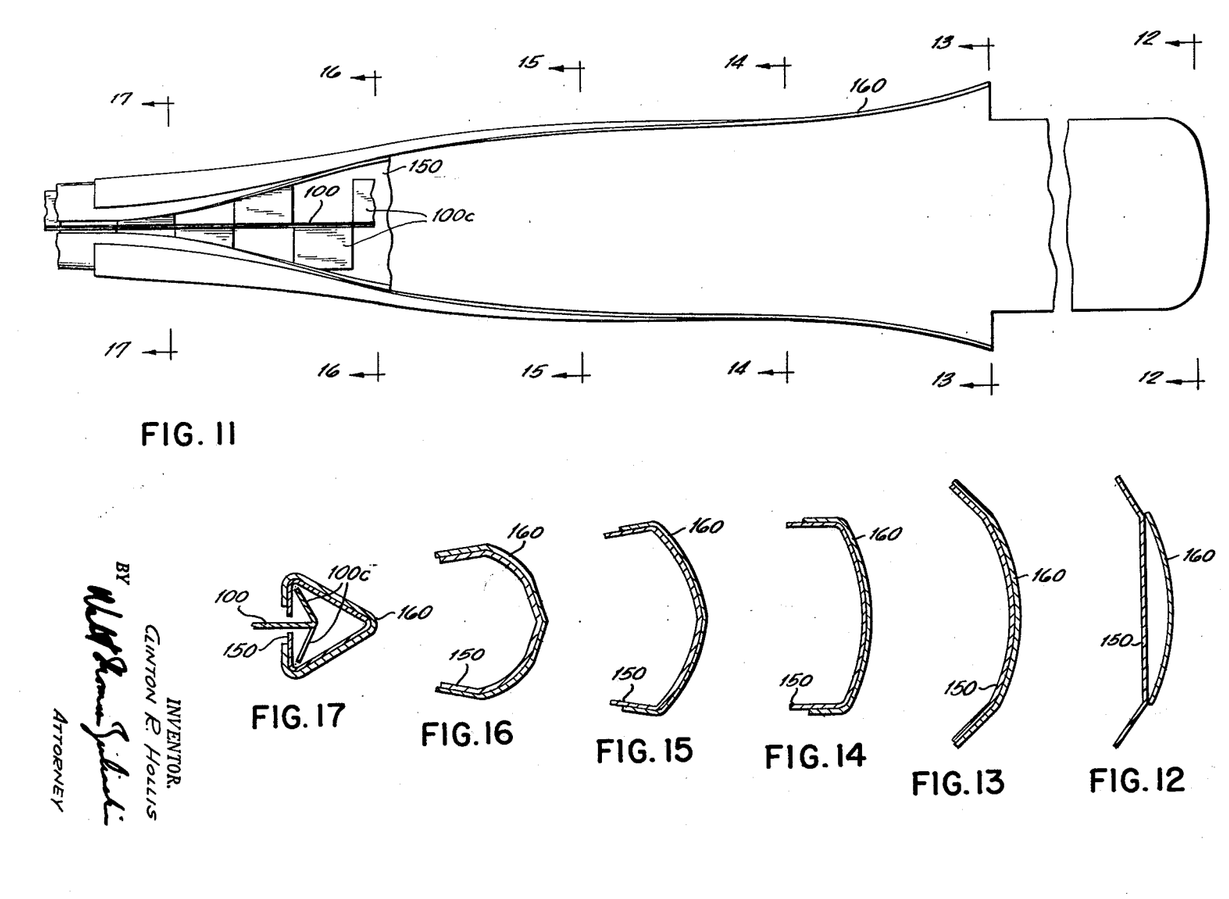
FIGURE 11 is a side view of an element of the fifth sub-assembly of FIGURE 2.
FIGURES 12 to 17 are sectional end views of the element of FIGURE 11, taken along lines 12—12, 13—13, 14—14, 15—15, 16—16, and 17—17, respectively.
Figure 18:
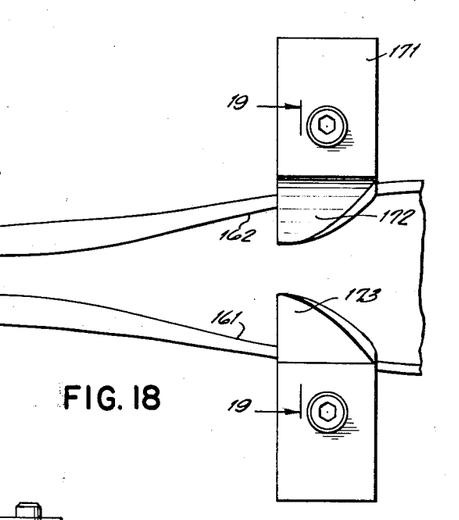
FIGURE 18 is a side view of another element of the sub-assembly of FIGURE 11.
Figure 19:
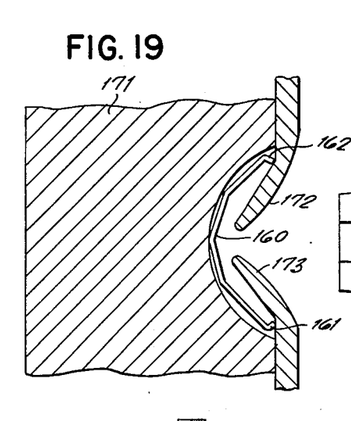
FIGURE 19 is a sectional end view of the element of FIGURE 18.

The principal element of unit E is shown in FIGURES 11 to 19. It consists of a tapering shoe 160 which guides glued tape 150 with reference to the end of tube 100 and tongues 100c thereon. Initially, stationary shoe 160 makes contact with laterally travelling glued tape 150 at about the scores provided thereon by unit C (see FIGURE 12). Then, the contact is increased to achieve a folding along such scores and a central bowing of tape 150 (see FIGURES 13 and 14) about the tube end and tongues. Clearly, such contact and the ambient temperature can cool the hot melt adhesive applied to tape 150 at unit D to an undesirable extent; the resulting tackiness of the glue may cause tape ruptures or other difficulties. To overcome this hazard, a heat device which is shown in FIGURES 18 and 19 can be connected to the preferably heat conductive shoe 160 somewhere in the vicinity of lines 13—13, 14—14, 15—15, or 16—16. This electric, hot water, or steam heater 170 is comprised of a body block 171 which is channeled to provide means for cupping about the back of shoe 160 closely enough to permit heat to be transmitted to such shoe and, through it, to the outside of glued tape 150. It is also comprised of two rods or fingers 172 and 173 which impinge against the lips 161 and 162 of shoe 160 to give added heat conduction and which extend into the hollow of shoe 160, and, therefore, glued tape 150 as it is shaped by shoe 160, to allow the heat radiated thereby to impinge more directly against the inside of the tape. FIGURE 17 shows the disposition of glued tape 150 over bag closure tongues 100c and the tube end near the discharge end of shoe 160 and arrows indicating the tongue enfolding movements of the portions of tape 150 between its borders and scorelines thereafter.

Figure 20:
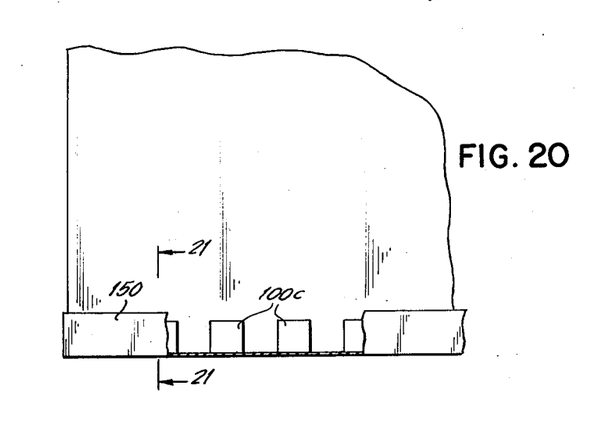
FIGURE 20 is a plan view, partially broken away, of the product of the present invention.
Figure 21:
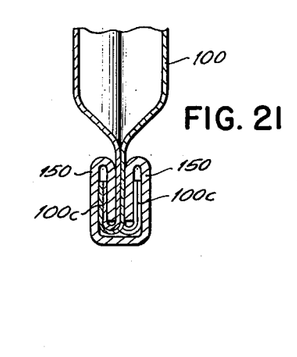
FIGURE 21 is a sectional end view of the product of FIGURE 20, taken along line 21—21.

As the taped ends of bag tubes 100 and 101 leave unit E and shoe 160, their further movement by chains 70 and 71 takes them to tape roller unit F, which in addition to providing the means with the aid of such chains of drawing tape 150 through units C, D, and E from its source of supply (not shown), provides a pair of knurled steel pressure rolls (see, for example, roll 180 in FIGURE 2) for compressing the closure formed in unit E and shown substantially completed in FIGURES 20 and 21. Thence, other means also linked, in the final analysis, to single draft shaft 35 can be used to convey the closed tubes to a pair of rubber pressure rolls which can be used in aid in the further distribution, on the principle of a squeegee, of the adhesive within the closure before such adhesive has dried or hardened. Similarly, the other means can comprehend those necessary to move the closed and taped bag tubes to a tape-cutting station such as is already well-known in the art. Such tubes have the desired closures of the present invention which are reflected in FIGURES 20 and 21 and comprise a laterally disposed plurality of tongues defined by longitudinal slits in the tube ends at spaced intervals, each alternate tongue being folded toward one of the opposing tube surfaces, and a tape having portions disposed over the tongues and over the tube ends. In addition, the closures include adhesive material which secures the tape to the surfaces of the tubes and to the tongues.

What is claimed is:

1. A process of making a closure on one end of a tube having opposing surfaces comprising travelling the end laterally, slitting the end longitudinally at spaced intervals to define a plurality of tongues, and folding each alternate tongue toward one of the opposing surfaces.

2. A process of making a closure on one end of a tube having opposing surfaces comprising travelling the end laterally, slitting the end longitudinally at spaced intervals to define a plurality of tongues, folding each alternate tongue toward one of the opposing surfaces, advancing a tape laterally with the end, disposing portions of the tape over the tongues, and positioning the remaining portion of the tape over the end.

3. A process of making a closure on one end of a tube having opposing surfaces comprising travelling the end laterally, impressing a crease line parallel to the end on the opposing surfaces, slitting the end longitudinally to the crease line at spaced intervals to define a plurality of tongues, folding each alternate tongue along the crease line toward one of the opposing surfaces, forming a pair of scorelines on a tape parallelly to its borders, advancing the tape laterally with the end, disposing portions of the tape between the scorelines and the borders over the tongues, and positioning the remaining portion of the tape over the end.

4. A process of making a closure on one end of a tube having opposing surfaces comprising travelling the end laterally, impressing a crease line of alternately male and female segments parallel to the end on the opposing surfaces, slitting the end longitudinally to the crease line at spaced intervals corresponding to the segment lengths to define a plurality of tongues, folding each alternate tongue along the crease line toward the one of the opposing surfaces impressed with the female segments, forming a pair of scorelines on a tape parallelly to its borders at distances therefrom substantially equal to the slit lengths, advancing the tape laterally with the end, disposing portions of the tape between the scorelines and the borders over the tongues, and positioning the remaining portion of the tape over the end.

5. A process of making a closure on one end of a tube having opposing surfaces comprising travelling the end laterally, impressing a crease line of alternately male and female segments parallel to the end on the opposing surfaces, slitting the end longitudinally to the crease line at spaced intervals corresponding to the segment lengths to define a plurality of tongues, folding each alternate tongue along the crease line toward the one of the opposing surfaces impressed with the female segments, forming a pair of scorelines on a tape parallelly to its borders at distances therefrom substantially equal to the slit lengths, applying adhesive to the tape outside and the tape inside between the scorelines and the borders, advancing the tape laterally with the end, disposing portions of the tape outside between the scoreline and the borders over the tongues to the crease line, positioning the remaining portion of the tape outside over the end, and pressing the tape inside between the scorelines and the borders against the opposing surfaces.

6. An apparatus for making a closure on one end of a tube having opposing surfaces comprising means for travelling the end laterally, means for slitting the end longitudinally at spaced intervals to define a plurality of tongues, and means for folding each alternate tongue toward one of the opposing surfaces.

7. The apparatus of claim 6 wherein the travelling means include a pair of parallelly and concurrently movable endless chains.

8. The apparatus of claim 6 wherein the slitting means include a pair of double edged shearing blades.

9. The apparatus of claim 6 wherein the folding means are reciprocally movable.

10. An apparatus for making a closure on one end of a tube having opposing surfaces comprising a pair of parallelly and concurrently movable endless chains for travelling the end laterally, a pair of double edged shearing blades for slitting the end longitudinally at spaced intervals to define a plurality of tongues, and reciprocally movable means for folding each alternate tongue toward one of the opposing surfaces.

11. An apparatus for making a closure on one end of a tube having opposing surfaces comprising means for travelling the end laterally and means for slitting the end longitudinally at spaced intervals to define a plurality of tongues and folding each alternate tongue toward one of the opposing surfaces.

12. The apparatus of claim 11 wherein the travelling means include a pair of parallelly and concurrently movable endless chains.

13. The apparatus of claim 11 wherein the slitting and folding means include a pair of double edged shearing blades, one blade being fixed and having therethrough means defining a tube feed channel and the other blade being reciprocally movable across the channel centerline and having thereon means adapted to engage the tongues individually.

14. An apparatus for making a closure on one end of a tube having opposing surfaces comprising a pair of parallelly and concurrently movable endless chains for travelling the end laterally and a pair of double edged blades for slitting the end longitudinally at spaced intervals to define a plurality of tongues and folding each alternate tongue toward one of the opposing surfaces, one blade being fixed and having therethrough means defining a tube feed channel and the other blade being reciprocally movable across the channel centerline and having thereon means adapted to engage the tongues individually.

15. An apparatus for making a closure on one end of a tube having opposing surfaces comprising means for travelling the end laterally and means for slitting the end longitudinally at spaced intervals to define a plurality of tongues and folding each alternate tongue toward one of the opposing surfaces about the travelling means.

16. The apparatus of claim 15 wherein the travelling means include a pair of parallelly and concurrently movable endless chains having thereon means adapted to provide substantially straight folding pivot lines.

17. The apparatus of claim 15 wherein the slitting and folding means include a pair of double edged shearing blades, one blade being fixed and having therethrough means defining a tube feed channel and the other blade being reciprocally movable across the channel centerline and having thereon means adapted to engage the tongues individually.

18. An apparatus for making a closure on one end of a tube having opposing surfaces comprising a pair of parallelly and concurrently movable endless chains having thereon means adapted to provide substantially straight folding pivot lines for travelling the end laterally and a pair of double edged shearing blades for slitting the end longitudinally at spaced intervals to define a plurality of tongues and folding each alternate tongue toward one of the opposing surfaces about a pivot line, one blade being fixed and having therethrough means defining a tube feed channel and the other blade being reciprocally movable across the channel centerline and having thereon means adapted to engage the tongues individually.

19. An apparatus for making a closure on one end of a tube having opposing surfaces comprising means for travelling the end laterally, means for impressing a crease line of alternately male and female segments parallel to the end of the opposing surfaces, means for slitting the end longitudinally at spaced intervals to define a plurality of tongues, and means for folding each alternate tongue toward one of the opposing surfaces.

20. The apparatus of claim 19 wherein the travelling means include a pair of parallelly and concurrently movable endless chains.

21. The apparatus of claim 19 wherein the impressing means include a pair of mated annular members comprised of rings of means alternately defining ridges and grooves of predetermined lengths.

22. An apparatus for making a closure on one end of a tube having opposing surfaces comprising a pair of parallelly and concurrently movable endless chains for travelling the end laterally, a pair of mated annular members comprised of rings of means alternately defining ridges and grooves of predetermined lengths for impressing a crease line of alternately male and female segments corresponding to the ridge and groove lengths parallel to the end on the opposing surfaces, a pair of double edged shearing blades for slitting the end longitudinally at spaced intervals corresponding to the segment lengths to define a plurality of tongues, and reciprocally movable means for folding each alternate tongue along the crease line toward the one of the opposing surfaces impressed with the female segments.

References Cited in the file of this patent

UNITED STATES PATENTS

| 1,789,807 | Currier | Jan. 20, 1931 |
| 2,027,205 | Sharkey | Jan. 7, 1936 |
| 2,892,580 | Williams | June 30, 1959 |
| 2,944,469 | Heinzer | July 12, 1960 |